April 20, 1926.
N. E. BROWN
ALL METAL INNER TUBE
Filed March 7, 1924
1,581,381
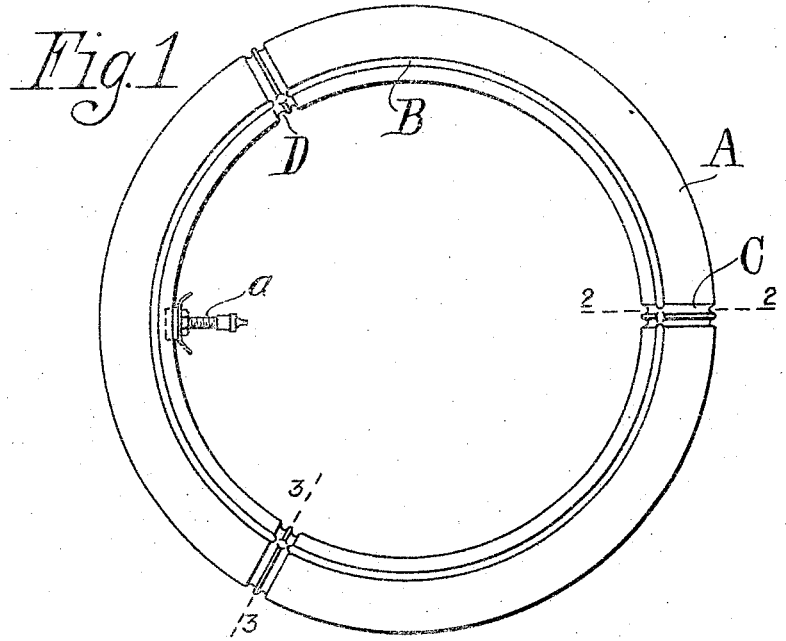
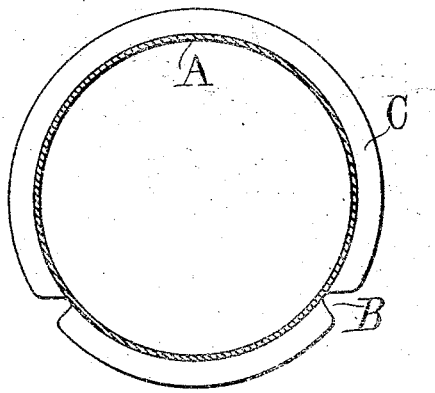
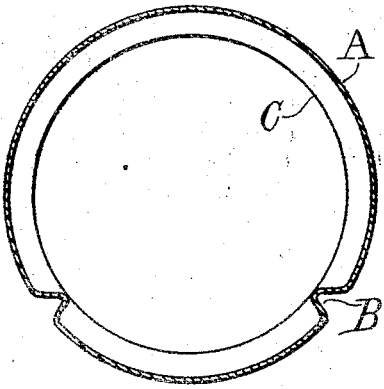
Inventor
Newman E. Brown,
By Edwin Guthrie,
Attorney Patented Apr. 20, 1926.

1,581,381

UNITED STATES PATENT OFFICE.

NEWMAN E. BROWN, OF ERIE, PENNSYLVANIA.

ALL-METAL INNER TUBE.

Application filed March 7, 1924. Serial No. 697,502.

*To all whom it may concern:*

Be it known that I, NEWMAN E. BROWN, citizen of the United States, residing at Erie, in the county of Erie and State of Pennsylvania, have invented certain new and useful Improvements in All-Metal Inner Tubes, of which the following is a specification.

This invention relates to all metal inner tubes for automobile wheel tires. It is not intended solely as an internal armor for the tire, but has the same functions in all respect as the usual inflated rubber inner tube and is used in place of the rubber tube. It is believed to be less susceptible of punctures in ordinary day by day road work, and it affords an equal air-cushioning effect with longer life in service than is given by the rubber tubes.

The object of the invention is the production of an all metal inner tube which may be introduced into any tire as a substitute for the rubber inner tube, and which possesses parts of special construction and arrangement.

In the accompanying drawings the particular formation and arrangement of parts are illustrated, and Fig. 1 shows a side view of an inner tube made in accordance with this invention. Fig. 2 is a cross-section on the broken line 2—2 of Fig. 1. Fig. 3 is a cross-section on the broken line 3—3 of Fig. 1. In Figs. 2 and 3 the scale of drawings is increased to practically full size. Throughout the drawings and description, the same letter is used to refer to the same part.

Considering the drawings, the tube A is a continuous tubular ring. It is formed of elastic metal such as tool or spring steel, and is relatively thin, in practice so thin as to require the sustaining effect of compressed air stored within the tube ring through the air valve $a$. This invention is not limited to the size of the tube, or to the metal of which it is made, nor to the thickness thereof or the amount of the internal air pressure. The air pressure is ordinarily that applied to the inflation of the rubber tubes and no special appliances are called for to store the air in this invention.

There are usually two side circumferential corrugations B, arranged as illustrated towards the inner circumference of the tube, and those corrugations are intersected by tube-encircling spaced groups of corrugations such as C and D. This invention is not limited to the number or size of the corrugations. It will be observed that the corrugations are inwardly-extending. That is to say, the outside surface of the tube has no projections due to the corrugations.

In operation, the side corrugations permit the tube where in contact with the ground in service to partly collapse with respect to the diameter of the tube and then recover, and the encircling corrugations allow the distortion with respect to the diameter of the ring as a whole. In other words, the construction described enables this invention to operate in use just the same as any other inner tube acts.

Having now described this invention and explained the mode of its operation, I claim:—

1. An inner tube for vehicle wheel tires, comprising a continuous tubular ring of relatively thin elastic metal requiring sustaining internal air pressure, said tube being provided with an air valve, and having inwardly-extending corrugations encircling the tube and so arranged as to permit the temporary distortion in service with respect to the diameter of the ring as a whole.

2. An inner tube for vehicle wheel tires, comprising a continuous tubular ring of relatively thin elastic metal requiring sustaining internal air pressure, said tube being provided with an air valve and having side circumferential corrugations and tube-encircling corrugations so arranged as to permit the temporary distortion in service with respect to the ring as a whole and to the diameter of the tube.

3. An inner tube for vehicle wheel tires, comprising a continuous tubular ring of relatively thin elastic metal requiring sustaining internal air pressure, said tube being provided with an air valve, and having side circumferential corrugations and a plurality of groups of spaced tube-encircling corrugations arranged to permit the temporary distortion in service with respect to the diameter of the ring as a whole and to the diameter of the tube.

In testimony whereof I affix my signature.

NEWMAN E. BROWN.